United States Patent [19]
James et al.

[11] Patent Number: 5,323,426
[45] Date of Patent: Jun. 21, 1994

[54] ELASTICITY BUFFER FOR DATA/CLOCK SYNCHRONIZATION

[75] Inventors: David V. James, Palo Alto; Donald N. North, Saratoga; Glen D. Stone, San Jose, all of Calif.

[73] Assignee: Apple Computer, Inc., Cupertino, Calif.

[21] Appl. No.: 839,973

[22] Filed: Feb. 21, 1992

[51] Int. Cl.$^5$ .............................................. H04L 7/00
[52] U.S. Cl. ................... 375/118; 370/102; 365/221; 365/233; 365/240; 377/50
[58] Field of Search ............... 375/118, 112; 370/102; 377/28, 50; 365/233, 240, 221

[56] References Cited

U.S. PATENT DOCUMENTS

| | | | |
|---|---|---|---|
| 4,811,340 | 3/1989 | McEachern et al. | 370/102 |
| 4,920,547 | 4/1990 | Murakami | 375/112 |
| 4,996,698 | 2/1991 | Nelson | 375/118 |

OTHER PUBLICATIONS

SCI, Scalable, Coherent Interface: Logical, Physical and Cache Coherence Specification, P1596/D2.00 Nov. 18, 1991, Draft, IEEE Standards Department, Piscataway, New Jersey, pp. 2-28 and 87-90.

Primary Examiner—Stephen Chin
Assistant Examiner—Hai H. Phan
Attorney, Agent, or Firm—Timothy D. Casey

[57] ABSTRACT

An elasticity buffer for use in a data transmission system having a transmitter and a receiver and utilizing a data transfer protocol that periodically supplies an elasticity element that can be deleted or replicated by the elasticity buffer to maintain the synchronous transfer of data elements. The elasticity buffer includes: a memory array and at least one flag per memory location operative to be set to a first or second state; a write controller operating at the transmitter clock for writing the data elements into the memory locations in a sequential order and setting the corresponding flags; a read controller operating at the receiver clock for reading the data elements from the memory locations in the sequential order; and a flag controller for reading the flags, determining if the transmitter clock is faster or slower than the receiver clock from the pattern of flags read from memory, communicating a delete signal to the read controller to delete an elastic symbol if the transmitter clock leads the receiver clock, and communicating a replicate signal to the read controller if the transmitter clock lags the receiver.

19 Claims, 3 Drawing Sheets

ELASTICITY BUFFER FOR DATA/CLOCK SYNCHRONIZATION

FIELD OF THE INVENTION

The present invention relates generally to data transfer protocols, and more particularly to reliable, synchronous data transfer utilizing any data transfer protocol that supplies, on a regular interval, a data element that may be deleted or replicated through use of an elasticity buffer.

BRIEF DESCRIPTION OF PRIOR ART

The process of transferring data between communicating devices of any type requires some type of transmitter, which sends data, and some type of receiver, which receives data. One method commonly used to transfer data is to also provide for a separate clock signal which is transmitted along with the data signal. The receiver then uses this clock signal to capture the data signal. The transmitter generates the clock signal at a frequency that is as close as possible to the receiver's internal clock frequency. If the frequency and phase relationship of the transmitter's clock signal is the same as the frequency and phase relationship of the receiver's clock signal, as is often the case in low-speed systems, the two clock signals are said to be synchronized. Data transfer between the transmitter and the receiver during periods of clock synchronization is usually highly accurate. Data corruption can occur, however, in many high-speed systems where it is not possible to guarantee that the transmitter's clock will always be exactly synchronized with the receiver's clock. For example, data elements will sometimes be undefined when sampled, data elements will be periodically dropped by the receiver if the transmitter's clock is faster than the receiver's clock, and data elements will be periodically duplicated by the receiver if the receiver's clock is faster than the transmitter's clock.

Some prior analog solutions to this problem include transmitting a carrier, superimposed on the high-frequency binary signal stream, which may be extracted at the receiver end and used to synchronize the receiver clock. A second prior solution is to utilize a phase-locked loop to lock on either the data stream or a pilot tone and drive the phase difference at the receiver to zero. Analog solutions for synchronizing clocks are hard to use in certain connection topologies (i.e., rings) and are often too design specific to be easily implemented under different vendor processes, i.e., analog circuit designs produced by one manufacturer must typically be redesigned in order to be produced by a different manufacturer. A third solution is to provide for a hold signal to be transmitted from the receiver back to the transmitter each time a nonsynchronized data transfer takes place. This solution, known as "handshaking," causes the transmitter to withhold the transmission of the next data signal until the receiver is ready, which limits the data transfer bandwidth.

A fourth solution is suggested by the proposed IEEE Scalable Coherent Interface (SCI), P1596 standard. The suggested solution is to utilize a data transfer protocol that periodically supplies a data element that can be "deleted" or "replicated", as appropriate, by the receiver. SCI is primarily directed to a ring-like system configuration (ringlet) where packets of data are sent from one node to another node over unidirectional links. A SCI node usually has its own clock (data transmission clock) which is approximately, but not exactly, the same frequency as the clock of any other attached node in the same ringlet. As previously described, this presents a problem for accurate data transmission because symbols within the packets can be deleted or inserted as the separate clocks drift in phase and frequency over time. SCI's solution to this problem, rather than to synchronize the data transmission clocks, is to transmit extra idle symbols which are received by a node in-between valid data packet symbols. These idle symbols, which are also referred to as elasticity symbols, may then be replicated or deleted as appropriate.

The SCI specification suggests that an elasticity buffer at the SCI input port, containing a multiple-tap, 2-symbol delay element of a length 2 T, where T is the duration of one symbol, be utilized for performing the insertion (replication) and deletion of elasticity elements (idle symbols). In particular, a symbol is to be inserted when the delay is increased by T and a symbol is to be deleted when the delay is decreased by T. Although the specification describes the general operation and uses of the elasticity buffer in great detail, no specific information is provided as to how such a buffer should be implemented. Given the present knowledge in the art, the elasticity buffer would most likely be implemented utilizing well known analog techniques, such as a phase-locked loop or a tapped delay line. What is needed, however, is a digital solution to the elasticity buffer which does not require handshaking, which minimizes metastability problems, and which presents a design that can be readily migrated across multiple vendor's processes for implementation in a wide variety of uses.

BRIEF SUMMARY OF THE INVENTION

A preferred embodiment of the present invention includes an elasticity buffer for use in a data transmission system having a transmitter and a receiver and utilizing a data transfer protocol that periodically supplies an elasticity element that can be deleted or replicated by the elasticity buffer to maintain the synchronous transfer of data elements. The elasticity buffer includes: a memory array and at least one flag per memory location operative to be set to a first or second state; a write controller operating at the transmitter clock for writing the data elements into the memory locations in a sequential order and setting the corresponding flags; a read controller operating at the receiver clock for reading the data elements from the memory locations in the sequential order, except when an elastic symbol is deleted or replicated; and a flag controller for reading the flags, determining if the transmitter clock is faster or slower than the receiver clock from the pattern of flags read from memory, communicating a delete signal to the read controller to delete an elastic symbol if the transmitter clock leads the receiver clock, and communicating a replicate signal to the read controller if the transmitter clock lags the receiver.

DETAILED DESCRIPTION OF PREFERRED EMBODIMENT

The present invention has application to any data transfer system that utilizes a protocol in which the transmitter supplies an extra symbol or data element to the receiver on a regular interval that may then be deleted or replicated as needed to support the synchronous transfer of data. In addition, this design is also compatible with both modes of operation of such systems, wherein either one data element is transferred per clock cycle or two data elements are transferred per clock cycle by transferring one data element on both the rising and falling edges of the clock.

Figure 1:
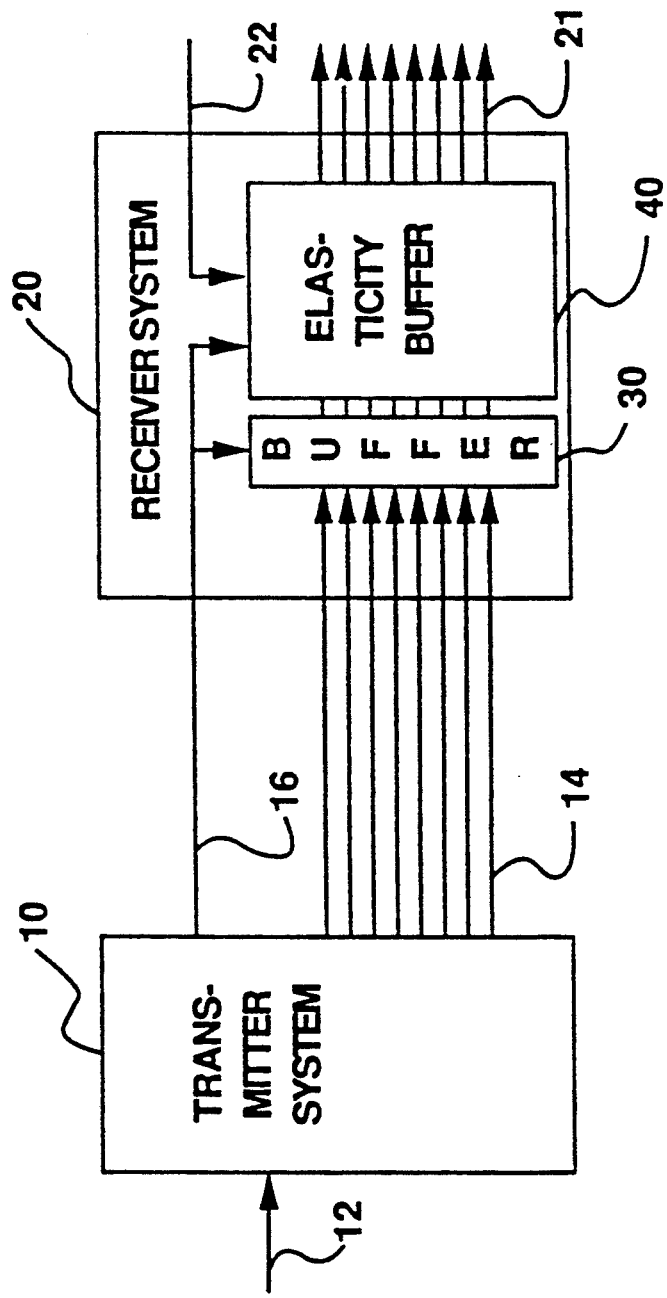
FIG. 1 is a block diagram illustrating a transmitter system and a receiver system employing an elasticity buffer in accordance with the preferred embodiment of the present invention.

The preferred embodiment of the present invention is illustrated in FIG. 1 in which transmitter system 10 receives a first clock signal 12 which is used to drive the transmission of data signals 14 to receiver system 20. Receiver system 20 then receives these data signals 14 and, if necessary, corrects the synchronization of these data signals 14 between transmitter 10 and receiver 20 before passing them on, as data signals 21, to a different system in communication with the receiver system 20. First clock signal 12 is generated from any of a wide number of sources, such as from the system clock of a computer linked to transmitter system 10. Transmitter system 10 also transmits a transmitter clock signal 16 to receiver system 20. Transmitter clock signal 16 is derived from first clock signal 12.

Receiver system 20 receives both the transmitter clock signal 16 and a second clock signal 22, which are both routed to elasticity buffer 40. Second clock signal 22 is likewise generated from any of a wide number of sources, such as a second computer linked to receiver system 20. Transmitter clock signal 16, which is also received by buffer 30, is used by buffer 30 to de-skew the data signals 14 received by receiver 20, as further explained below. It should be noted that receiver system 20 could be alternatively implemented without de-skewing logic 30, but in such an implementation, data signals 14 received by elasticity buffer 40 may not always be aligned. Preferably, the data signals input to elasticity buffer 40 are de-skewed.

Figure 2:
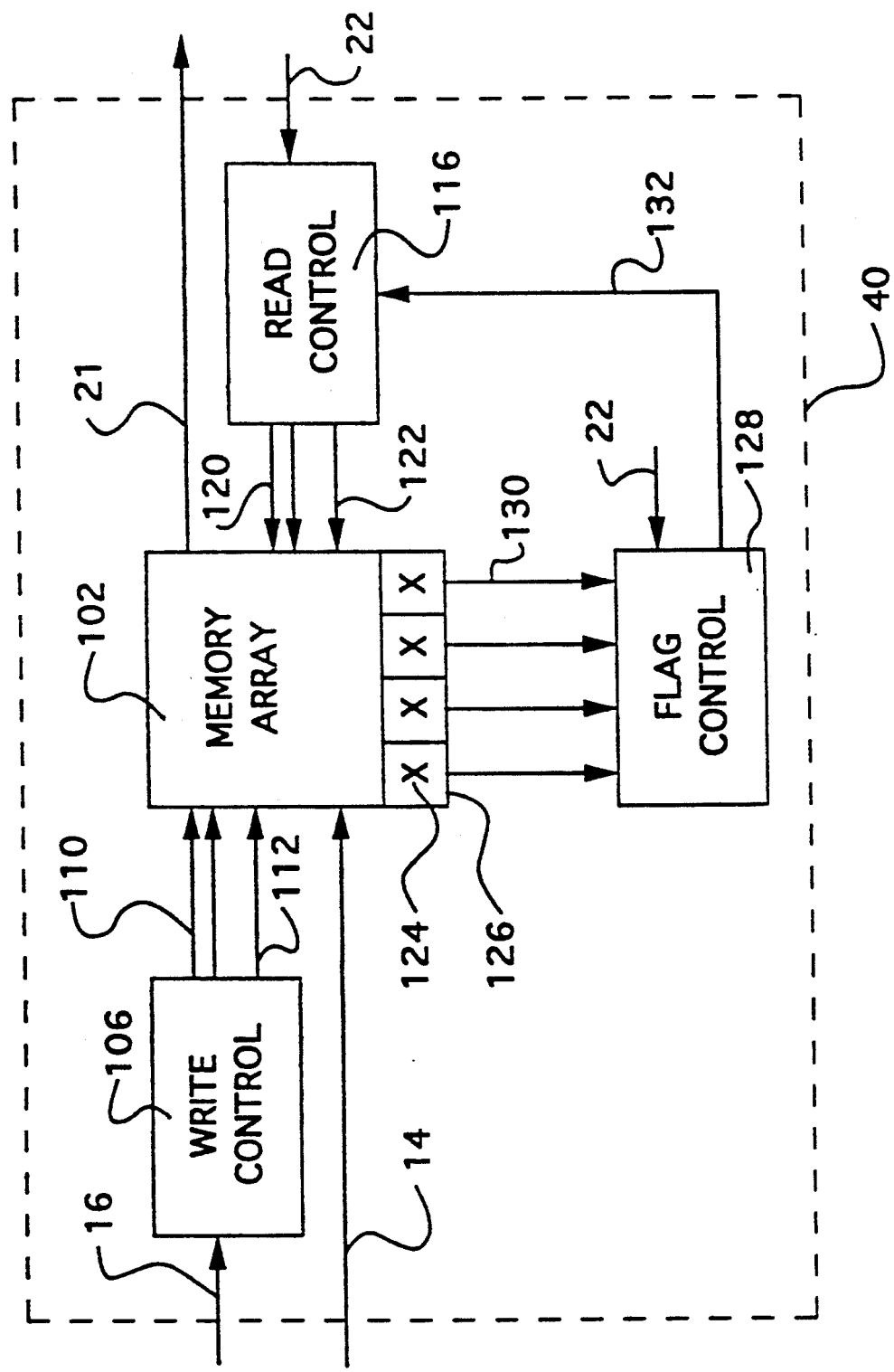
FIG. 2 is a block diagram of the elasticity buffer of FIG. 1.

The receiver resident elasticity buffer 40 illustrated in FIG. 1, is further described and illustrated in FIG. 2, which specifies how the elasticity buffer 40 operates to cyclically detect the direction of drift between a transmitter's clock and a receiver's clock, waits for the previously described protocol dependent data element or symbol to be transmitted, and duplicates or deletes that symbol as necessary to support the continued synchronization of the receiver's hardware. As illustrated in FIG. 2, the preferred embodiment of this elasticity buffer 40 includes a memory array 102 which has a number of individual memory entries for writing and reading data elements. Although there is no maximum to the number of possible memory entries in Memory Array 102, and although an eight element memory array is preferred, a four element memory array is described herein for the purposes of simplification. Data elements, as data signals 14, received by Memory Array 102 from transmitter system 10 are written into the Memory Array 102 using transmitter clock signal 16. Write Control logic 106 receives the transmitter clock signal 16, determines which address or addresses of Memory Array 102 should be written to next, and outputs appropriate address signals 110 and write signals 112 to Memory Array 102 so that data elements are written into the proper memory entries.

Data elements are written into the Memory Array 102 in a sequential order. Thus, Memory Array 102 conceptually operates as a ring buffer. For example, if Write Control 106 employed an address counter to select memory locations to write, the address count would have to repeat itself after the fourth memory location had been filled. Data elements are read from Memory Array 102 using the receiver's second clock signal 22 under the control of Read Control logic 116 and output over Data Out 21. Like Write Control 106, Read Control 116 provides address signals 120 and read signals 122 to Memory Array 102 so that data elements can be read from its memory entries in a sequential (circular) order. Each memory entry of Memory Array 102 has an associated flag bit 124 stored in a flag register 126. These flag bits 124, input to Flag control logic 128 as flag bit signals 130, are used to determine the direction of drift between the transmitter clock signal 16 and the receiver clock signal 22. Flag Control 128 operates under control of receiver clock 22 and provides a drift direction signal 132 to Read Control 116 whenever a clock phase/frequency drift condition is detected.

The preferred method for using these flag bits will now be described. In this preferred embodiment, only Write Control 106 has the ability (or authority) to set the flag bits 124, associated with the memory arrays written by write control 106, in flag registers 126, and only Flag Control 128 has the authority to read the flag bits 124. If it is assumed that all of the flag bits 124 are set to zero and that the current memory location of Memory Array 102 to be written is memory location one, then while memory location one is being written, memory location one's associated flag bit would be set to one. On the next cycle, memory location two would be written and its associated flag bit would likewise be set to one. This process would continue until all four memory locations had been written and all flag bits had been set to one. Then the cycle of writing the four memory locations and setting the flag bits would be repeated, except that the flag bits would be set to zero, etc.

In the mean time, because Memory Array 102 is a four location memory, Flag Control 128 would preferably sample the flag bits every four cycles, although other sampling rates could be used if desired. In addition, if Memory Array 102 had more than four memory locations, the sampling rate of Flag Control 128 might certainly be different. In either case, the sampling rate of Flag Control 128 need not be specifically defined because it may be desirable to sample the flag bits at a slower rate in some situations to reduce the chance of metastability problems. In the preferred embodiment, if the transmitter clock and receiver clock were synchronized, then Flag Control 128, which is clocked off the receiver clock 22, would observe either four zeros or four ones at its interval sample, such as illustrated in Table 1 below.

As the transmitter clock and receiver clock began to drift, Flag Control 128 would observe something other than a sampled pattern of four ones or zeros, such as a pattern of only three contiguous ones or zeros.

TABLE 1
FLAG BITS WRITTEN/TRANSMITTER CLOCK CYCLE WHEN TRANSMITTER AND RECEIVER CLOCKS ARE SYNCHRONIZED

|  | FLAG BITS | | | | |
|---|---|---|---|---|---|
|  | 1 | 2 | 3 | 4 | |
| TRANSMITTER CLOCK CYCLES | 0 | 0 | 0 | 0 | ←SAMPLE |
|  | 1 | 0 | 0 | 0 | |
|  | 1 | 1 | 0 | 0 | |
|  | 1 | 1 | 1 | 0 | |
|  | 1 | 1 | 1 | 1 | ←SAMPLE |
|  | 0 | 1 | 1 | 1 | |
|  | 0 | 0 | 1 | 1 | |
|  | 0 | 0 | 0 | 1 | |
|  | 0 | 0 | 0 | 0 | ←SAMPLE |

Based on the change in this sampled pattern, and what was expected to be sampled by Flag Control logic 128, the direction of drift in the clocks could be detected from this sample. For example, if Flag Control 128 expected the sampled patterns to be comprised of all ones, and instead got a zero followed by three ones, Flag Control 128 would know that the transmitter clock was operating faster than the receiving clock, such as is illustrated in Table 2. Flag Control 128 would know the transmitter clock 16 was faster because when sampling the flag bits 124, Flag Control 128 would expect to see all ones, which implies that the last write by Write Control 106 was to the fourth memory location, otherwise the pattern would be three ones followed by a zero, but, since the sampled pattern is a zero followed by three ones, Write Control 106 has already written the fourth memory location and has moved on to start the new cycle of writing zeros, beginning at memory location one. Thus, Write Control 106 is ahead of Flag Control 128, which is based on the receiver clock 22, meaning the transmitter clock 16 is ahead of the receiver clock 22.

Likewise, Flag Control 128 would be able to determine if transmitter clock 16 was slower than receiver clock 22 because instead of seeing four ones at the sampled period, Flag Control 128 would sample a pattern of three ones followed by one zero, meaning that Write Control 106 did not write the fourth memory location when expected. The situation where the transmitter clock 16 is operating slower than the receiver clock 22 is illustrated in Table 3.

Preferably, the address lag between the read address and write address is determined by dividing the number of memory locations in

TABLE 2
FLAG BITS WRITTEN/TRANSMITTER CLOCK CYCLE WHEN TRANSMITTER CLOCK IS FASTER THAN RECEIVER CLOCK

|  | FLAG BITS | | | | |
|---|---|---|---|---|---|
|  | 1 | 2 | 3 | 4 | |
| TRANSMITTER CLOCK CYCLES | 0 | 0 | 0 | 0 | ←SAMPLE |
|  | 1 | 0 | 0 | 0 | |
|  | 1 | 1 | 0 | 0 | |
|  | 1 | 1 | 1 | 0 | |
|  | 0 | 1 | 1 | 1 | ←SAMPLE |

TABLE 3
FLAG BITS WRITTEN/TRANSMITTER CLOCK CYCLE WHEN TRANSMITTER CLOCK IS SLOWER THAN RECEIVER CLOCK

|  | FLAG BITS | | | | |
|---|---|---|---|---|---|
|  | 1 | 2 | 3 | 4 | |
| TRANSMITTER CLOCK CYCLES | 0 | 0 | 0 | 0 | ←SAMPLE |
|  | 1 | 0 | 0 | 0 | |
|  | 1 | 1 | 0 | 0 | |
|  | 1 | 1 | 1 | 0 | |
|  | 1 | 1 | 1 | 0 | ←SAMPLE |

Memory Array 102 by two, although other address lags could be selected. In the present embodiment, the reading of memory locations trails the writing of memory locations by two addresses, meaning that the read address is two address locations behind the write address. For example, if on a given clock cycle, memory location three was being written, then memory location one would be read. On the next cycle, location four would be written and location two would be read, assuming, of course, that the clocks are synchronized. When Flag Control 128 recognizes that the transmitter clock 16 is faster than the receiver clock 22, it will act to delete a data element. Deletion involves not reading a data element, which can only be an elasticity element, from the current memory location (as addressed by Read Control 116). Deletion is accomplished by incrementing the Read Control 116 address counter by two, instead of one, as would be normal. To assure that only elasticity elements are deleted, Read Control 116 may want to peek at each data element to assure that the data element to be deleted is an elasticity element. Conversely, Read Control 116 would not need to peek at each data element when the location of an elasticity element can be predicted, i.e. at the trailing end of a data packet. Instead, the address counter for Read Control 116 would be incremented in response to clock drift direction signal 132, and the next memory location would be read. At the same time, the sample cycling count for Flag Control 128 would be corrected to correspond to Read Control 116.

Figure 3:
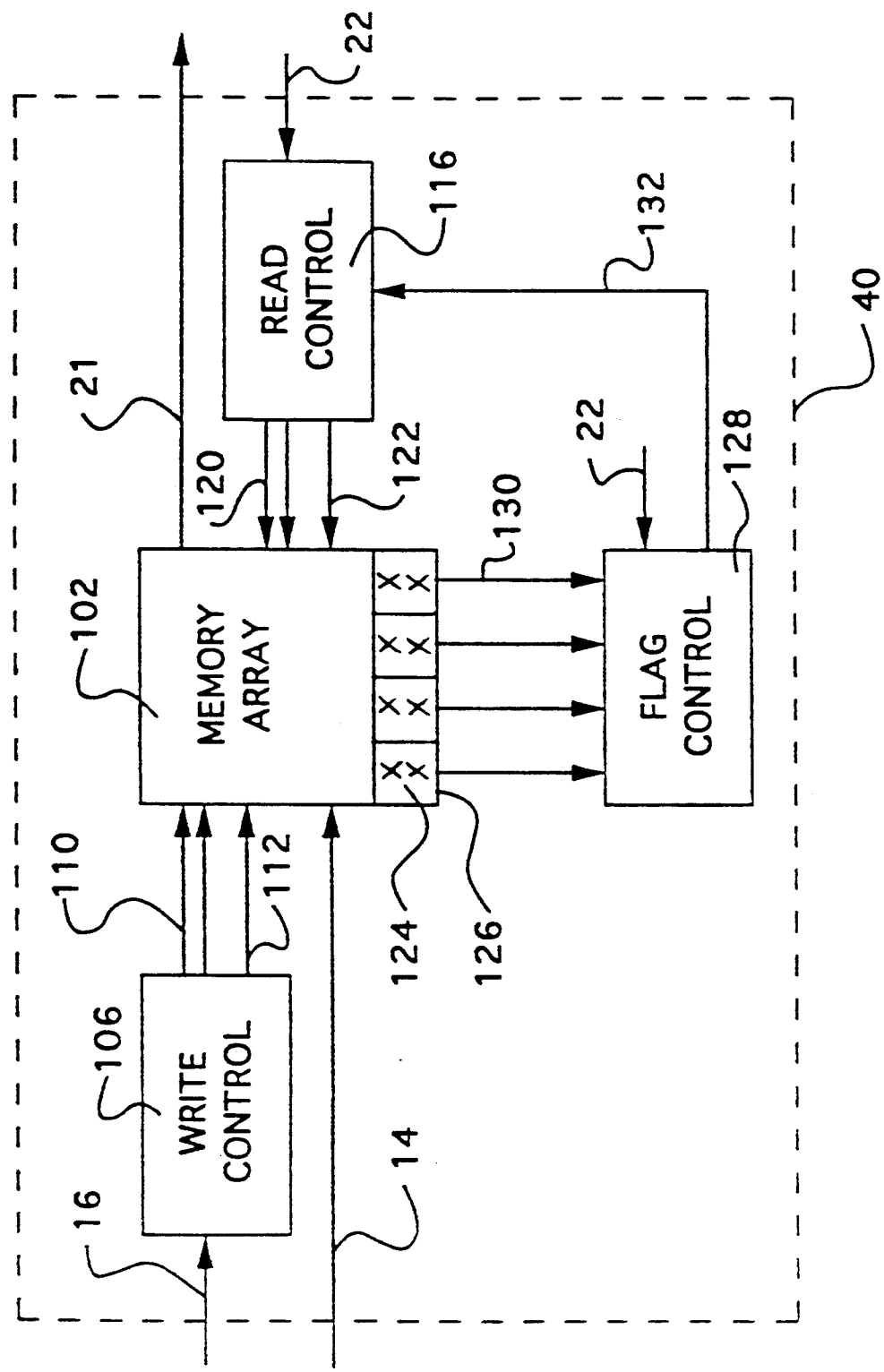
FIG. 3 illustrates in block diagram form another embodiment of the elasticity buffer of FIG. 1.

Alternatively, the elasticity buffer 40 could be further improved by doubling the number of flag bits 124, as illustrated in FIG. 3 where flag registers 126 each hold two flag bits 124. By having Write Control 106 set the flag bits 124 every half cycle, the granularity at which the drift in the clocks could be monitored would be increased, thereby allowing for simpler Read Control logic 116. In addition, the Read Control logic 116 would now be able to incorporate "hysteresis" to account for clocks that continually change the direction in which they drift. Hysteresis would operate to offset the decision points, such that control logic circuits would not "toggle" between states at a boundary condition.

An alternative method for using these flag bits will now be described. In this embodiment, both Write Control 106 and Read Control 116 have the ability to set the flag bits 124. Thus, a flag bit 124 is set when its associated memory location is written by Write Control 106, and the flag bit 124 is reset by Read Control 116 when the associated memory location is read. Once again, only Flag Control 128 has the ability to read the flag registers 126. Since the read address is also two address locations behind the write address, as in the preferred embodiment, a rotating flag bit pattern of "1100" is produced. Flag Control 128 will recognize the transmitter clock 16 as being faster than receiver clock 22, when after some number of cycles, the reading address is three addresses behind the writing address, i.e., the flag bits are set to three ones and one zero. As discussed above, Flag Control logic 128 recognizes this pattern as indicating that a data element must be deleted. Deletion is accomplished by not reading a data element from the current memory location (as addressed by the Read Control logic 116). Instead, the address counter is incremented by two (instead of by one, which would be normal) and the next memory location is read, and both the current and next memory flag bits are set to "0". After this procedure, the flag registers 126 would again contain the flag bit pattern of two ones and two zeros.

If the transmitter clock 16 is slightly slower than the receiver clock 22, then after some number of cycles, the flag bit pattern will contain three zeros and a one. In this case, the address counter will not be incremented for one read cycle and the current memory location will be read twice.

It should also be noted that the separation between the active write memory address and the active read memory address implies that the same memory location will never be written and read concurrently. Hence, metastable events do not normally present a problem while reading the data elements. Although an optimization of this design would be to allow the writing and reading of the same buffer location concurrently, careful design practices would need to be employed so as to avoid metastability. Metastability can be a problem, however, when reading the flag registers 126 since all of the flag registers 126 are read at once. In this case, a metastable condition can occur when the clock drift is enough that a flag bit 124 is set just as the flag register is read. A solution to this problem is to sample the flag registers 126 periodically, as described above, where the period between samples is long enough to allow possible metastable events to settle. Since the drift between clocks is slow enough, it is not necessary to sample the flag bits on every cycle.

Although the present invention has been described with reference to FIGS. 1 and 2 and Tables 1-3 and with emphasis on two particular embodiments, it should be understood that these figures are for illustration only and should not be taken as complete limitations upon the scope and application of the invention. It is contemplated that many changes and modifications may be made by those skilled in the art to the elements, process and arrangement of steps of the process of the invention without departing from the spirit and scope of the invention as disclosed above.

We claim:

1. An elasticity buffer for use in a data transmission system having a data transfer protocol that periodically supplies a data element that can be deleted or replicated by the data transmission system in order to maintain a synchronous transfer of data elements between a transmitter operating at a first clock and a receiver operating at a second clock, said elasticity buffer comprising:

a memory for receiving said data elements from said transmitter and for storing said data elements in a plurality of memory locations, said memory including a plurality of flag registers corresponding to said plurality of memory locations, each of said plurality of flag registers having one of a plurality of flags operative to be set to an opposite logical state each time one of said data elements is stored in a corresponding one of said plurality of memory locations;

a write controller operating at said first clock for specifying to said plurality of flag registers one of said plurality of flags to be set to an opposite logical state when a corresponding one of said plurality of memory locations is written, said plurality of memory locations being written in a sequential order and said plurality of flags in said plurality of flag registers being set in said sequential order;

a read controller operating at said second clock for specifying to said memory the memory locations of said plurality of memory locations from which said data elements are to be read, said data elements being read from said plurality of memory locations in said sequential order unless said read controller receives a delete signal or a replicate signal changing said sequential order; and a flag controller operating at said second clock for periodically reading all of said plurality of flags from said plurality of flag registers so as to form a state pattern from said plurality of flags, analyzing said state pattern to determine if said first clock and said second clock are in phase, and if said first clock leads said second clock by a predetermined amount, communicating said delete signal to said read controller to cause said read controller to change said sequential order to delete one of said data elements, and if said first clock lags said second clock by a predetermined amount, communicating said replicate signal to said read controller to cause said read controller to change said sequential order to replicate one of said data elements.

2. An elasticity buffer as recited in claim 1, wherein said write controller writes said data elements into said plurality of memory locations a number of addresses ahead of when said read controller reads said data elements from said plurality of memory locations.

3. An elasticity buffer as recited in claim 2, wherein said read controller is operative to specify to said plurality of flag registers one of said plurality of flags to be set to an opposite logical state when a corresponding one of said plurality of memory locations is read.

4. An elasticity buffer as recited in claim 3, wherein said flag controller is operative to determine that said first clock and said second clock are in phase when a first predetermined number of said plurality of flags from said state pattern read from said plurality of flag registers is of a first logical state and a second predetermined number of said plurality of flags from said state pattern is of a second logical state.

5. An elasticity buffer as recited in claim 1, wherein said flag controller reads all of said plurality of flags to form said state pattern after a predetermined number of cycles of said second clock.

6. An elasticity buffer as recited in claim 1, wherein said plurality of flag registers each include two flag bits for each one of said plurality of memory locations, including a first flag bit which is set to an opposite logical state at a first half cycle of said first clock and a second flag bit which is set to an opposite logical state at a second half cycle of said first clock.

7. An elasticity buffer as recited in claim 1, wherein said read controller is operative to specify to said plurality of flag registers one of said plurality of flags to be set to an opposite logical state when a corresponding one of said plurality of memory locations is read.

8. An elasticity buffer as recited in claim 7, wherein said flag controller is operative to determine that said first clock and said second clock are in phase when a first predetermined number of said plurality of flags from said state pattern read from said plurality of flag registers is of a first logical state and a second predetermined number of said plurality of flags from said state pattern is of a second logical state.

9. An elasticity buffer as recited in claim 1, wherein said flag controller is operative to determine that said first clock and said second clock are in phase when all of said plurality of flags from said state pattern read from said plurality of flag registers are of a first logical state.

10. In a data transmission system having a transmitter operating at a first clock and a receiver operating at a second clock and utilizing a data transfer protocol that periodically supplies elasticity elements that can be deleted or replicated by an elasticity buffer at the receiver so as to maintain a synchronous transfer of data elements between the transmitter and the receiver, the elasticity buffer comprising:

a memory for receiving said data elements, including at least one of said elasticity elements, from said transmitter and for storing said data elements in a plurality of memory locations in accordance with a write command and a write memory address, said memory including a plurality of flag registers corresponding to said plurality of memory locations, each of said plurality of flag registers having one of a plurality of flags operative to be set to an opposite logical state each time one of said data elements is stored in a corresponding one of said plurality of memory locations;

a write controller operating at said first clock for communicating said write command and said write memory address to said memory for each data element to be stored in one of said plurality of memory locations, said write controller being operative to set one of said plurality of flags when a corresponding one of said plurality of memory locations is written with one of said data elements, said plurality of memory locations being written in a sequential order and said plurality of flags in said plurality of flag registers being set in said sequential order;

a read controller operating at said second clock for communicating a read command and a read memory address to said memory for each data element to be read from said plurality of memory locations, said plurality of memory locations being read in said sequential order unless said read controller receives a delete signal or a replicate signal changing said sequential order; and a flag controller operating at said second clock for periodically reading a combination of said plurality of flags from said memory, said combination including said plurality of flags set in either a first logical state or a second logical state, determining that said first clock and said second clock are in phase when said plurality of flags form a first combination, determining that said first clock leads said second clock when said plurality of flags form a second combination, determining that said first clock lags said second clock when said plurality of flags form a third combination, communicating said delete signal to said read controller to cause said read controller to change said sequential order to delete one of said elasticity elements when said flag controller reads said second combination, and communicating said replicate signal to said read controller to cause said read controller to change said sequential order to replicate one of said elasticity elements when said flag controller reads said third combination.

11. The elasticity buffer as recited in claim 10, wherein said write controller communicates said write command and said write memory address to said memory a number of addresses ahead of when said read controller communicates said read command and said read memory address to said memory.

12. The elasticity buffer as recited in claim 11, wherein said read controller is operative to reset one of said plurality of flags when a corresponding one of said plurality of memory locations is read.

13. The elasticity buffer as recited in claim 12, wherein said combination of flags read from said memory includes all of said plurality of flags, and wherein in said first combination a first predetermined number of said plurality of flags is set to said first logical state and a second predetermined number of said plurality of flags is set to said second logical state.

14. The elasticity buffer as recited in claim 10, wherein said combination of flags read from said memory includes all of said plurality of flags, and wherein in said first combination all of said plurality of flags are set to either said first logical state or said second logical state.

15. The elasticity buffer as recited in claim 10, wherein said flag controller reads said combination of flags from said memory after a predetermined number of cycles of said second clock.

16. The elasticity buffer as recited in claim 10, wherein said plurality of flag registers each include two flag bits for each one of said plurality of memory locations, including a first flag bit which is set to an opposite logical state at a first half cycle of said first clock and a second flag bit which is set to an opposite logical state at a second half cycle of said first clock.

17. The elasticity buffer as recited in claim 10, wherein said read controller is operative to reset one of said plurality of flags when a corresponding one of said plurality of memory locations is read.

18. The elasticity buffer as recited in claim 17, wherein said combination of flags read from said memory includes all of said plurality of flags, and wherein in said first combination a first predetermined number of said plurality of flags is set to said first logical state and a second predetermined number of said plurality of flags is set to said second logical state.

19. In a data transmission system as recited in claim 10, the receiver comprising a de-skewing logic controller for receiving said data elements from said transmitter, for de-skewing said data elements, and for communicating de-skewed data elements to said elasticity buffer.

* * * * *